Patented Aug. 4, 1931

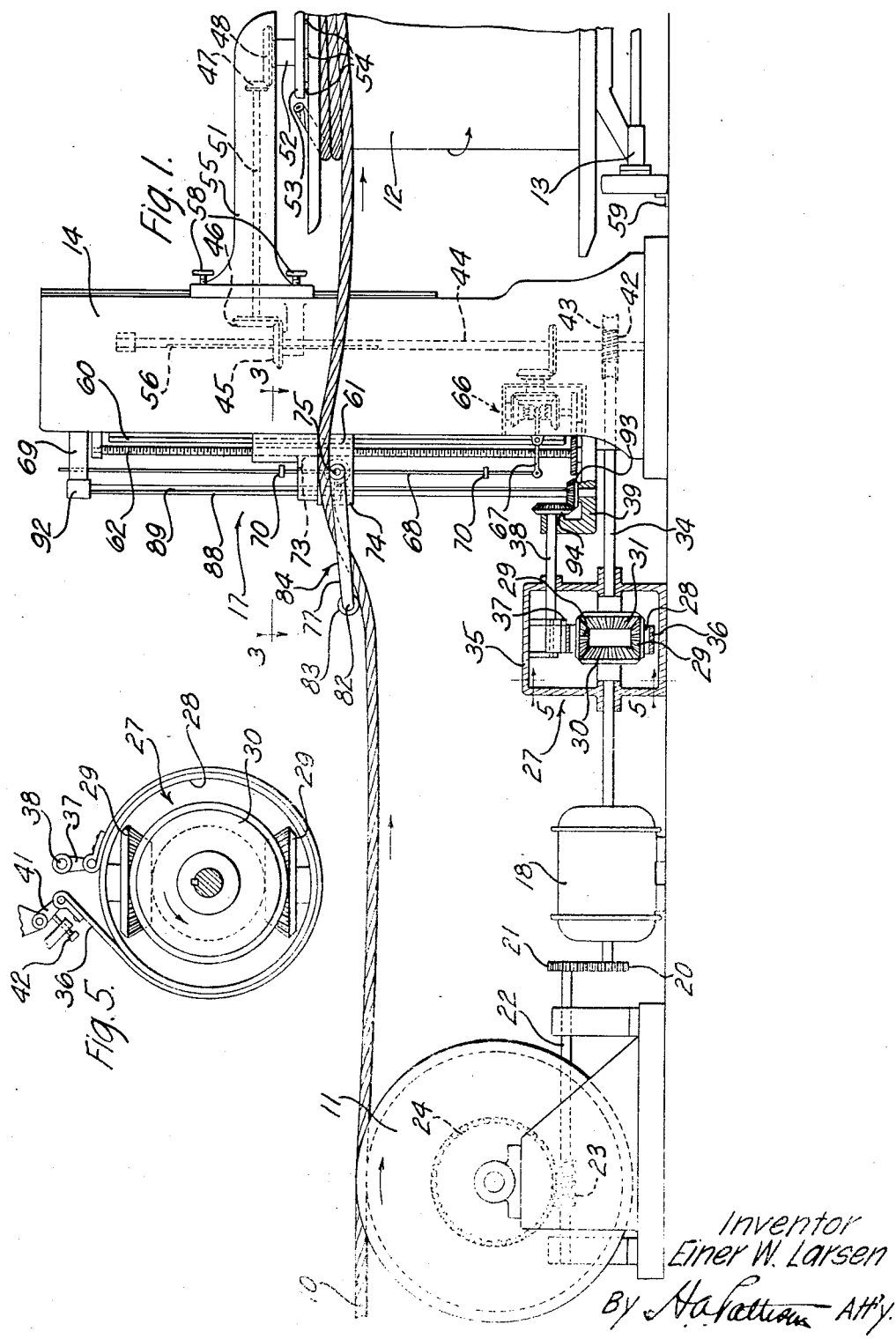

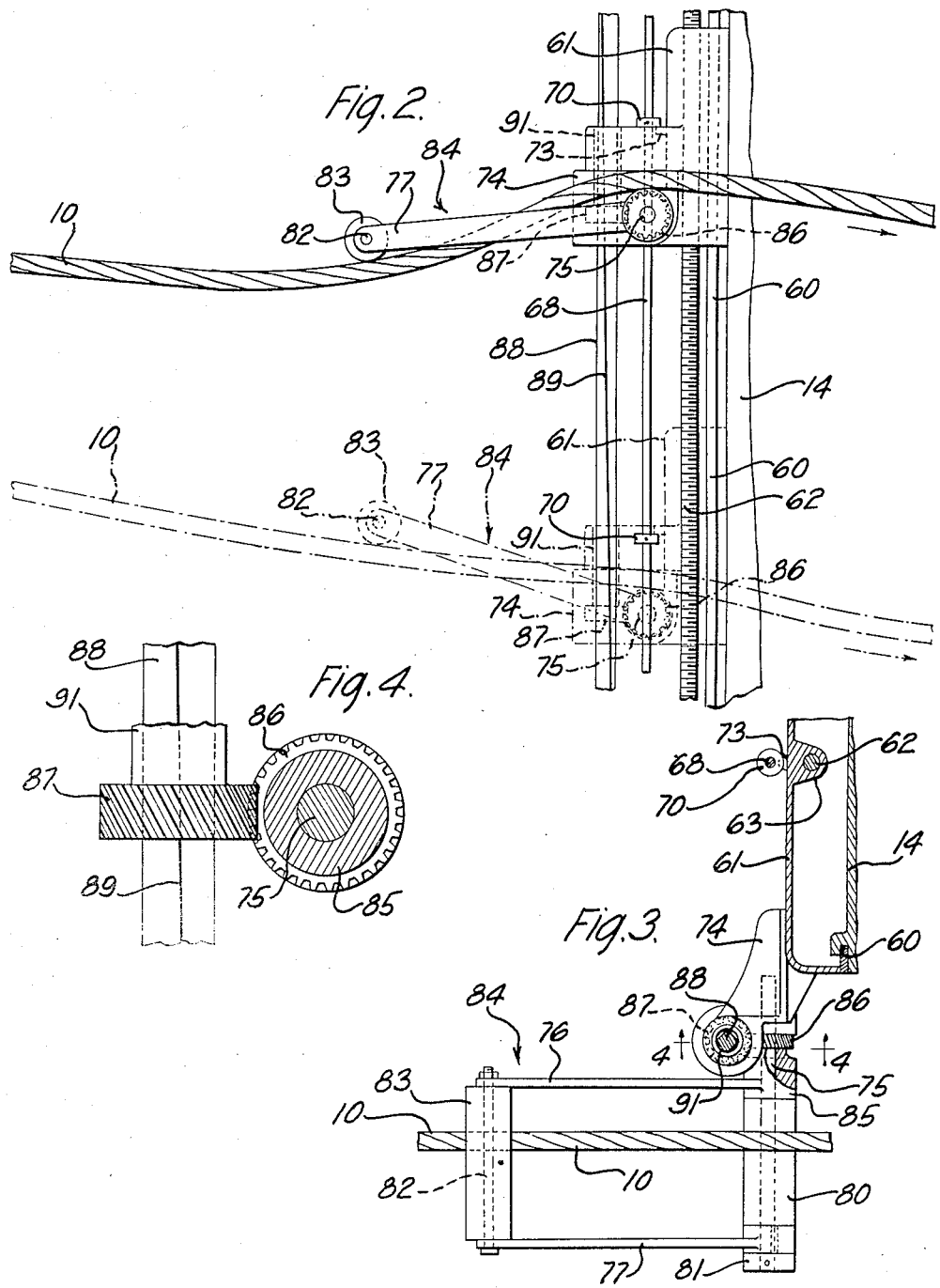

1,816,909

UNITED STATES PATENT OFFICE

EINER WILLIAM LARSEN, OF CHICAGO, ILLINOIS, ASSIGNOR TO WESTERN ELECTRIC COMPANY, INCORPORATED, OF NEW YORK, N. Y., A CORPORATION OF NEW YORK

MATERIAL HANDLING APPARATUS

Application filed April 6, 1929. Serial No. 352,987.

This invention relates to material handling apparatus, and more particularly to apparatus for reeling strand material upon a reel or core.

The primary object of this invention is to provide a simple and efficient apparatus for winding material under a substantially constant tension.

In accordance with one embodiment of this invention as applied to the take-up of a telephone cable stranding apparatus, there is provided a pivotally and reciprocably movable arm, responsive to the tension of the cable, which at its free end rests upon the cable core as it travels from a common point of a constant speed capstan to a take-up device or reel during distribution of the cable thereon which results from the reciprocable movement of the arm. The arm is operatively connected with a control means of a variable speed mechanism for driving the reel and reciprocating the arm by means which includes a shaft provided longitudinally with a helical driving surface which is operatively connected to the arm. The shaft is actuated in response to a movement of the arm differing from its normal oscillatory movement, when variations in the tension of the cable occur, for varying the driving power transmitted by the variable speed mechanism for maintaining a substantially constant tension on the cable.

Other objects and advantages of this invention will more fully appear from the following detailed description taken in connection with the accompanying drawings, in which Fig. 1 is a fragmentary front view of one end of a telephone cable core stranding apparatus embodying the features of this invention;

Fig. 2 is a fragmentary enlarged view of Fig. 1 showing different positions of the pivotally and reciprocably mounted arm responsive to the tension of the cable core;

Fig. 3 is an enlarged plan section taken on the line 3—3 of Fig. 1;

Fig. 4 is an enlarged vertical detail section taken on the line 4—4 of Fig. 3, and Fig. 5 is an enlarged vertical detail section of a variable speed mechanism included in the power drive taken on the line 5—5 of Fig. 1.

The features of this invention have been shown embodied in the take-up of a telephone cable core stranding apparatus. For a description and illustration of the stranding apparatus, which has been omitted from the drawings, since it is not necessary to a complete understanding of this invention, reference may be had to Patent 1,579,769 to H. F. Jones, dated April 6, 1926.

Referring now to the drawings in detail wherein like reference numerals refer to similar parts, and particularly to Fig. 1, a stranded cable core 10 is drawn from the stranding apparatus (not shown) by a power driven capstan 11, the core being wound upon a power driven take-up reel 12 carried on a truck 13. Between the capstan 11 and the reel 12 is a standard or pedestal 14 supporting a distributing mechanism 17, which includes the features of this invention to be presently described, for feeding the cable core 10 as delivered from the capstan 11 to the rotating reel 12 in such a manner that the core is coiled thereon in close even spirals under a substantially constant tension. In Fig. 1 the operative drive from a driving motor 18 to the capstan 11 and the take-up reel 12 is illustrated in a schematic skeletonized manner for the sake of simplicity, since the specific form and arrangement of the driving elements are not necessary to a complete understanding of this invention. The capstan 11 is rotated at a constant desired speed in a clockwise direction from the shaft of the motor 18 by gears 20 and 21 fixed to one end of the motor shaft and a shaft 22, respectively, the shaft 22 having fixed thereto a worm 23 which meshes with a worm wheel 24 fixed to the capstan shaft.

Arranged between the take-up reel 12 and the driving motor 18, which as hereinbefore mentioned drives the reel, is a variable speed or differential mechanism 27, the driving torque transmitted therefrom being varied in accordance with variations in the tension of the cable from a predetermined normal tension as it is taken up on the reel 12. This differential mechanism 27 is an adaptation of the well known differential gear and comprises a brake ring 28 upon the inner periphery of which are rotatably carried two bevel pinions 29 meshing with bevel gears 30 and 31 fixed to the right end of the motor shaft and a shaft 34, the opposite ends of which are journaled in a differential housing 35 and the pedestal 14. Engaging the periphery of the ring 28 is a brake band 36 for controlling the speed of the ring 28. The brake band 36 at one end (Fig. 5) is attached to one end of a lever 37, the opposite end of which is fixed to a shaft 38 journaled at opposite ends in the housing 35 and in a bracket 39 fixed to the pedestal 14. The other end of the brake band 36 is attached to an adjustable pivotal arm 41 engaged by an adjustment screw 42; the arm and screw are each journaled in the housing 35. The purpose of the adjustable arm 41 is to provide an initial frictional engagement between the brake band 36 and the periphery of the brake ring 28 and thereby provide a normal speed of rotation of the shaft 34 from the constant speed motor shaft for rotating a take-up reel 12. It will be apparent, that any loosening of the brake band 36 upon the brake ring 28 from its initial engagement permits an increase in the speed of the brake ring and causes, through the differential gears, a decrease in the speed of the take-up reel 12.

The shaft 34 by means of a worm 42 fixed to the right end thereof meshing with a worm wheel 43 fixed to a vertical shaft 44 and a plurality of bevel gears 45, 46, 47 and 48 and shafts 51 and 52 serves to rotate the take-up reel 12 in a direction indicated by the arrow. The shaft 52 is operatively engaged with the upper head of the reel 12 by means of a clutch plate 53 carrying a plurality of pins 54 which engage in suitable apertures (not shown) in the reel head. The gears 45, 46, 47 and 48 of the shafts 51 and 52 are all journaled in an over-hanging horizontal arm 55 slidably mounted for vertical positioning upon the pedestal 14, it being understood that the bevel gear 45 is rotatable with but slidable upon the shaft 44 by means of a spline connection 56. With this construction the arm 55 may be raised upon the pedestal 14 by means (not shown) after loosening hand screw clamps 58. The reel 12 is then predeterminedly positioned under the clutch plate 53, which is facilitated by guide strips 59 secured to the floor for guiding the wheels of the core truck 13 carrying the reel and thereafter the arm 55 is lowered to engage the clutch pins 54 in the apertures of the upper head of the reel. The drive to the reel is now completed.

Reciprocably mounted in a pair of vertical slideways 60 provided on the left side of the pedestal 14, one of which is shown in Figs. 1, 2 and 3, is a traversing carriage 61, the movement of which serves to distribute the cable core 10 upon the rotating reel 12 in close, even spirals under a substantially constant tension. Journaled upon the pedestal 14 between the slideways 60 is a vertical rotatable distributing screw shaft 62 which is threaded through a boss 63 formed on an inner surface of the carriage 61. The shaft 62 is constantly rotated at a suitable speed from the shaft 44 by a chain of gears shown in dotted outline in Fig. 1, which includes a well known type of reversing mechanism 66 which is actuated at predetermined intervals to reverse alternately the direction of rotation of the shaft 62, thus causing alternate traversing movements of the carriage 61. A clutch shifting lever 67 pivoted upon the left side of the pedestal 14 is connected at opposite ends with the reversing mechanism 66 and the lower end of a reciprocable rod 68 slidably supported at its upper end in a bracket 69 fixed to the pedestal 14. Adjustably mounted on the rod 68 is a pair of predetermined spaced collars 70 which are engaged alternately by opposite faces of an abutment 73, formed on the traversing carriage 61, at the end of each reciprocation thereof in opposite directions to rock the shifting lever 67 about its pivot and thus actuate the reversing machanism 66 and change the direction of rotation of the screw shaft 62.

Referring particularly to Figs. 2 and 3, the carriage 61 carries a bracket 74 to which is fixed a forwardly extending shaft 75 upon which is pivoted a pair of spaced arms 76 and 77. Carried on the shaft 75 between the arms 76 and 77 is a roller 80 (Fig. 3), the arms and the roller being secured on the shaft by a collar 81 pinned to the shaft. The free ends of the arms 76 and 77 are interconnected by a pin 82 carrying a roller 83 between the arms, the arms and the rollers comprising a tension responsive arm 84. As clearly illustrated in Figs. 3 and 4 the arm 76 is provided with a hub portion 85 and formed integral with the rear face thereof and coaxial with the shaft 75 is a helical gear 86 meshing with a similar gear 87 splined on a vertically disposed rotatable shaft 88. The gear 87 is provided on its upper end face (Figs. 2 and 4) with an integral elongated bearing portion 91 which is rotatably journaled in a suitable manner on the reciprocable bracket 74 and surrounds the shaft 88 but does not engage the same. The shaft 88 in the embodiment illustrated in the drawings is square in cross-section and twisted longitudinally to provide a large helical angle 89, the gear 87 being provided with an axial aperture complementary to the square section of the shaft and slidable thereon, thus providing a spline connection of the gear upon the shaft. A bearing bracket 92 and the previously mentioned bracket 39 (Fig. 1) both fixed to the pedestal 14 rotatably support the shaft 88 at its opposite ends. Fixed to the lower end of the shaft 88 is a bevel gear 93 which meshes with a similar gear 94 fixed to the right end of the shaft 38, the latter at its opposite end, as hereinbefore described, carrying the lever 37 to which is attached one end of the brake band 36.

The operation of this cable core distributing and tension responsive apparatus for distributing the core 10 on the take-up reel 12 in close even spirals under a substantially constant tension is as follows: With the parts in the position illustrated by full lines in Figs. 1 and 2, the cable core 10 is delivered from a common point of the constant speed capstan 11 to the rotating take-up reel 12, the core traveling under and over the rollers 83 and 80, respectively, of the tension responsive arm 84 pivoted on the traversing carriage 61. The carriage 61 is shown as moving downwardly, due to the rotation of the screw shaft 62 with a few coils of the core 10 having already been wound upon the rotating reel 12. It should be understood that the initial adjustment of the brake band 28 of the differential mechanism 27 provides a normal predetermined tension on the core as it is wound upon the reel 12, due to the reel being driven at such a speed that it tends to reel the core faster than it is delivered thereto by the constant speed capstan 11. As the reel 12 is gradually wound with the core 10, the effective diameter thereof becomes greater, thereby increasing the tension on the core. An increase in the tension, however, causes the core 10 to bear harder upwardly against the free end of the tension responsive arm 84, which thereupon acting through the helical gears 86 and 87 and the shafts 88 and 38 and the cooperating gears 93 and 94 and brake band lever 37 results in a loosening of the brake band 36 upon the brake ring 28 of the differential mechanism 27. Any loosening of the brake band 36 permits of an increase in speed of the brake ring 28, causing through the differential gears a decrease in the speed of the reel 12, and consequently a reduction in the tension on the core 10 to a predetermined normal tension.

As the carriage 61 moves downwardly from its full line position to its dotted line position (Fig. 2), the core 10 will be wound upon the reel 12 in close even spirals and during this movement of the carriage the tension responsive arm 84 will rotate or oscillate upon the shaft 75 through a large angle, the free end of the arm following the core, due to the action of gravity, and at the termination of its downward movement it will have assumed the position shown in dotted lines. During the movement of the carriage upwardly the arm 84 will again rotate upon the shaft 75 through a similar angle and another layer of the core 10 will have been coiled upon the reel 12. The large angular movement of the arm 84 during its reciprocation with the carriage 61 is due to the closeness of the common delivery point of the core 10 from the capstan 11, thus forming a sharp angle in the core during its distribution upon the reel 12 and since the roller 83 of the arm rests on the core the arm will follow the core. During these normal angular movements or oscillations of the arm 84 the helical gear 87, it is obvious, will be rotated upon the shaft 88 through the rotation of the helical gear 86 integral with the arm, but the rotation of the gear 87 will not be effective to cause a rotation of the shaft 88, due to the compensative effect of the helical angle or twist 89 of the shaft, the gear 87 merely moving upon the shaft with a combined reciprocatory and rotary motion.

It will readily be seen that if due to any reason there should be an increase in the tension on the core 10 at any point in the reciprocation of the carriage 61 there will occur an oscillatory movement of the arm 84 differing from its normal movement at any point in its reciprocation. This increase in the tension on the core 10 will result in an upward movement of the arm 84 about its pivot and through the cooperating helical gears 86 and 87 the shaft 88 will immediately be rotated by means of the helical driving surface or spline connection between the gear 87 and the shaft and in the manner previously described cause a decrease in the torque of the differential mechanism 27 and thereby decreasing the speed of rotation of the reel 12 and in turn reducing the tension on the core to a normal tension.

In the case of a decrease in the tension on the core 10 from its normal tension at any point in the reciprocation of the carriage 61, the core will become loose and tend to move downwardly away from the free end of the tension responsive arm 84. The arm 84 will immediately follow the core 10, due to gravity, and the movement thereof will immediately be transmitted in the manner and through the elements hereinbefore described in connection with an increase of the tension on the core only in a reverse direction to increase the torque of the differential mechanism 27, thereby resulting in an increase in the speed of rotation of the reel 12 and providing a normal tension thereon.

Although the invention has been disclosed and described as applied to a particular type of apparatus, it should be understood that the novel features thereof are capable of other applications within the scope of the appended claims.

What is claimed is:

1. In an apparatus for winding material, a take-up member, means for communicating power to the take-up member, an element responsive to the tension on the strand and having a normal range of movement during winding under constant tension and movable differently from its normal movement in response to tension variations in the material being wound, and means operatively connected to the element and operable in response to a movement of the element differing from its normal movement for varying the power communicated to the take-up member.

2. In an apparatus for reeling strands, a take-up reel, means for communicating power to the take-up reel, a reciprocable element responsive to the tension on the strand and having a normal range of movement during reeling under a constant tension and movable differently from its normal movement in response to tension variations in the strand being reeled, and a shaft along which the element reciprocates operatively connected to the element and operable responsive to a movement of the element differing from its normal movement for varying the power communicated to the take-up reel.

3. In an apparatus for reeling strands, a take-up reel, means for communicating power to the take-up reel, a reciprocable element resting on the strand responsive to the tension thereon and having a normal range of movement during reeling under a constant tension and movable differently from its normal movement in response to tension variations in the strand being reeled, and a shaft along which the element reciprocates operatively connected to the element and operable in response to a movement of the element differing from its normal movement for varying the power communicated to the take-up reel.

4. In an apparatus for reeling strands, a take-up reel, means for communicating power to the take-up reel, an element responsive to the tension on the strand and having a normal range of movement during reeling under a predetermined constant tension and movable differently from its normal movement in response to tension variations in the strand being reeled, and means operatively connecting the element with the power communicating means including a member having a helical surface cooperating with other elements of the connecting means and movable in response to a movement of the element differing from its normal movement for varying the power communicated to the take-up reel.

5. In an apparatus for reeling strands, a take-up reel, means for communicating power to the take-up reel, a reciprocable and pivotal element responsive to the tension on the strand for distributing the strand upon the take-up device and having a normal range of pivotal movement during reeling under a predetermined constant tension and pivotally movable differently from its normal pivotal movement in response to tension variations in the strand being reeled, and a shaft along which the element reciprocates operatively connected to the element and operable in response to a pivotal movement of the element differing from its normal pivotal movement at any point in its reciprocation for varying the power communicated to the take-up reel.

6. In an apparatus for reeling strands, a take-up reel, means for communicating power to the take-up reel, an element responsive to the tension on the strand and having a normal range of movement during reeling, under a predetermined constant tension and movable differently from its normal movement in response to tension variations in the strand being reeled, and means operatively connecting the element with the power communicating means including a shaft having a conformation cooperating with other elements of the connecting means for permitting a normal range of movement of the element without imparting motion to the shaft and causing motion of the shaft in response to a movement of the element differing from its normal movement for varying the power communicated to the take-up reel.

7. In an apparatus for reeling strands, a take-up reel, means for communicating power to the take-up reel, an element responsive to the tension on the strand and having a normal range of movement during reeling under a constant tension and movable differently from its normal movement in response to tension variations in the strand being reeled, and means operatively connecting the element with the power communicating means including a pair of rotary operatively engaged members movable with the element, one of which is also movable about the axis thereof, and a rotary shaft with a longitudinally helical driving surface and with the other of the cooperating members splined thereon permitting a normal range of movement of the element without rotation of the shaft and only allowing rotation of the shaft upon a movement of the element differing from its normal movement for varying the power communicated to the take-up reel.

8. In an apparatus for reeling strands, a reel, means for rotating the reel, a reciprocable strand guiding and tension responsive element having a normal range of movement during reeling under a constant tension and movable differently from its normal movement in response to tension variations in the strand being reeled, means for delivering the strand from a constant point to the element, and means including a shaft along which the element reciprocates operatively connecting the element and the reel rotating means, the shaft operable in response to a movement of the element differing from its normal movement for varying the torque of the reel rotating means.

9. In an apparatus for reeling strands, a reel, means for rotating the reel, a strand guiding and tension responsive element having a simultaneous pivotal and reciprocable normal range of movement during reeling under a constant tension and pivotally movable differently from its normal pivotal movement in response to variations in the tension of the material being reeled, and means including a shaft along which the element reciprocates operatively connecting the element and the reel rotating means, the shaft operable in response to a pivotal movement of the element differing from its normal pivotal movement during reciprocation for varying the torque of the reel rotating means.

10. In an apparatus for reeling strands, a reel, means for rotating the reel, a strand guiding and tension responsive element having a normal range of movement during reeling under a constant tension and movable differently from its normal movement in response to variations in the tension of the strand being reeled, and means operatively connecting the element and the reel rotating means, the last mentioned means including a shaft having a helical surface, and means splined thereon and responsive to a movement of the element differing from its normal movement for transmitting motion to the shaft for varying the torque of the reel rotating means.

11. In an apparatus for reeling cable, a reel, means for rotating the reel, a pivotal and reciprocable cable guiding and tension responsive element having a normal range of movement during reeling under a constant tension and movable differently from its normal movement in response to variations in the tension of the cable being reeled and means operatively connecting the element and the reel rotating means, the last mentioned means including a rotary square twisted shaft, a member splined thereon and means rotatable with and about the pivotal axis of the element and cooperating with the member in response to a movement of the element differing from its normal movement for transmitting rotary motion to the shaft for varying the torque of the reel rotating means.

12. In an apparatus for winding materal, a take-up reel, variable means for rotating the take-up reel to wind material thereon, a rotatable bar, a member reciprocable upon the bar, an element pivotally carried by the member for distributing the material evenly upon the take-up reel, the element having a predetermined pivotal movement through its reciprocatory motion along the bar and being pivotally movable differently from said predetermined movement in response to tension variations in the material being wound, means responsive to a pivotal movement of the element differing from its predetermined pivotal movement for rotating the bar, and means responsive to a rotary motion of the bar for varying the reel rotating means to thereby vary the rotative speed of the reel.

13. In an apparatus for winding strands, a take-up reel, variable means for rotating the take-up reel to wind a strand thereon, a rotatable shaft, a member reciprocable upon the shaft, an element pivotally carried by the member for distributing the strand evenly upon the take-up reel, the shaft having a longitudinal helical surface effective through a reciprocatory motion of the member on the shaft for causing a predetermined pivotal movement of the element, the element being pivotally movable differently from said predetermined movement in response to tension variations in the strand being reeled, means responsive to a pivotal movement of the element differing from its predetermined movement for rotating the shaft, and means effective upon the rotation of the shaft for varying the reel rotating means to thereby vary the rotative speed of the reel.

In witness whereof, I hereunto subscribe my name this 26th day of March A. D. 1929.

EINER WILLIAM LARSEN.